United States Patent
Kitagawa

(10) Patent No.: US 7,183,737 B2
(45) Date of Patent: Feb. 27, 2007

(54) MOTOR CONTROL DEVICE AND MOTOR CONTROL METHOD

(75) Inventor: Takayuki Kitagawa, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 321 days.

(21) Appl. No.: 10/892,723

(22) Filed: Jul. 16, 2004

(65) Prior Publication Data
US 2005/0019024 A1  Jan. 27, 2005

(30) Foreign Application Priority Data
Jul. 17, 2003  (JP) .................. 2003-276195

(51) Int. Cl.
*G05B 11/18* (2006.01)

(52) U.S. Cl. .............. 318/599; 318/798; 318/811; 388/804

(58) Field of Classification Search ......... 388/804, 388/871, 831, 901; 318/599, 798, 811; 369/44, 369/26; 360/45; 375/371
See application file for complete search history.

(56) References Cited

U.S. PATENT DOCUMENTS
2003/0048706 A1 * 3/2003 Kobayashi .............. 369/44.26

FOREIGN PATENT DOCUMENTS
JP  06-237591  8/1994
JP  2000-278986  10/2000

* cited by examiner

*Primary Examiner*—Karen Masih
(74) *Attorney, Agent, or Firm*—Fay Kaplun & Marcin, LLP

(57) ABSTRACT

A motor control device selectively turns on or off a drive transistor in-accordance with a PWM control signal Sp, such that a drive current Im supplied to a motor is adjusted. The device also samples and holds a motor current Sm for obtaining a motor current value Ih. With reference to the motor current value Ih, the device protects the motor from an overcurrent. Sampling and holding of the motor current Sm is performed for a sampling and holding time Ts. The sampling and holding time Ts corresponds to a time period between a first point in time when the level of the PWM control signal Sp is switched for turning off the drive transistor and a second point in time that precedes the first point in time by a predetermined period. As a result, the motor current value Ih is detected with high accuracy.

9 Claims, 4 Drawing Sheets

MOTOR CONTROL DEVICE AND MOTOR CONTROL METHOD

BACKGROUND OF THE INVENTION

The present invention relates to a device and a method for controlling a motor based on a current flowing through the motor.

As a method for controlling the speed of a motor, the pulse width modulation (PWM) controlling is known. Such technique is described in, for example, Japanese Laid-Open Patent Publication No. 6-237591. More specifically, a PWM control signal is supplied to a field effect transistor (FET), which supplies a drive current to the motor, such that the FET is selectively turned on or off. A resistor is connected in series with the motor for detecting a current flowing through the motor. The detection is achieved by sampling and holding the current flowing through the motor for a time sufficiently shorter than the time for which the PWM control signal remains activated. The timing for sampling and holding the motor current is set at the middle of the activation time of the PWM control signal. The duty ratio of the PWM control signal is adjusted such that the detected current becomes constant.

While the PWM control signal is altered in a pulse-like manner, the current flowing through the motor is varied relatively moderately, as compared to the PWM control signal. Therefore, if the sampling and holding of the motor current is started at the aforementioned timing, which corresponds to the middle of the activation time of the PWM control signal, the sampling and holding may be completed prematurely, or before the motor current becomes sufficiently large. If this is the case, the detected current may become smaller than the actual value.

Further, a motor control device with an overcurrent protecting function is also generally known. The control device judges whether or not the drive current supplied to the motor is an overcurrent. If the judgment is positive, the device suspends the current supply to the motor for protecting the motor from seizure, which is otherwise caused by the overcurrent.

In this device, if sampling and holding of the motor current is performed at the aforementioned timing, which corresponds to the middle of the activation time of the PWM control signal, the premature current detection may hamper the overcurrent protecting function.

In order to solve this problem, sampling and holding of the motor current may be started at a timing corresponding to a trailing edge of the PWM control signal. In this case, the detected current becomes sufficiently large. Further, at this timing, it is relatively easy to start the sampling and holding of the motor current.

However, since the motor current is varied relatively greatly following the trailing edge of the PWM control signal, the detected current may be inaccurate. This also hampers the overcurrent protecting function.

SUMMARY OF THE INVENTION

Accordingly, it is an objective of the present invention to provide a motor control device and a motor control method that are capable of detecting a current flowing through a motor with high accuracy.

To achieve the foregoing and other objectives and in accordance with the purpose of the present invention, the invention provides a device for controlling a motor by means of a switching element. The device outputs a pulse-like control signal to the switching element. The control signal is switched between high level and low level for selectively turning on or off the switching element such that the motor is supplied with a current in correspondence with a turned on state of the switching element. The device samples and holds the current supplied to the motor for a predetermined sampling and holding time for obtaining a value of the motor current. The device controls the motor in accordance with the obtained value. The device determines, as the sampling and holding time, a time period between a first point in time when the level of the control signal is switched for turning off the switching element and a second point in time that precedes the first point in time by a predetermined period.

The present invention also provides a method for controlling a motor by means of a switching element. The method includes: outputting a pulse-like control signal to the switching element, the control signal being switched between high level and low level for selectively turning on or off the switching element such that the motor is supplied with a current in correspondence with a turned on state of the switching element; sampling and holding the current supplied to the motor for a predetermined sampling and holding time for obtaining a value of the motor current; controlling the motor in accordance with the obtained value; and determining, as the sampling and holding time, a time period between a first point in time when the level of the control signal is switched for turning off the switching element and a second point in time that precedes the first point in time by a predetermined period.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will hereafter be described with reference to FIGS. 1 and 2.

Figure 1:
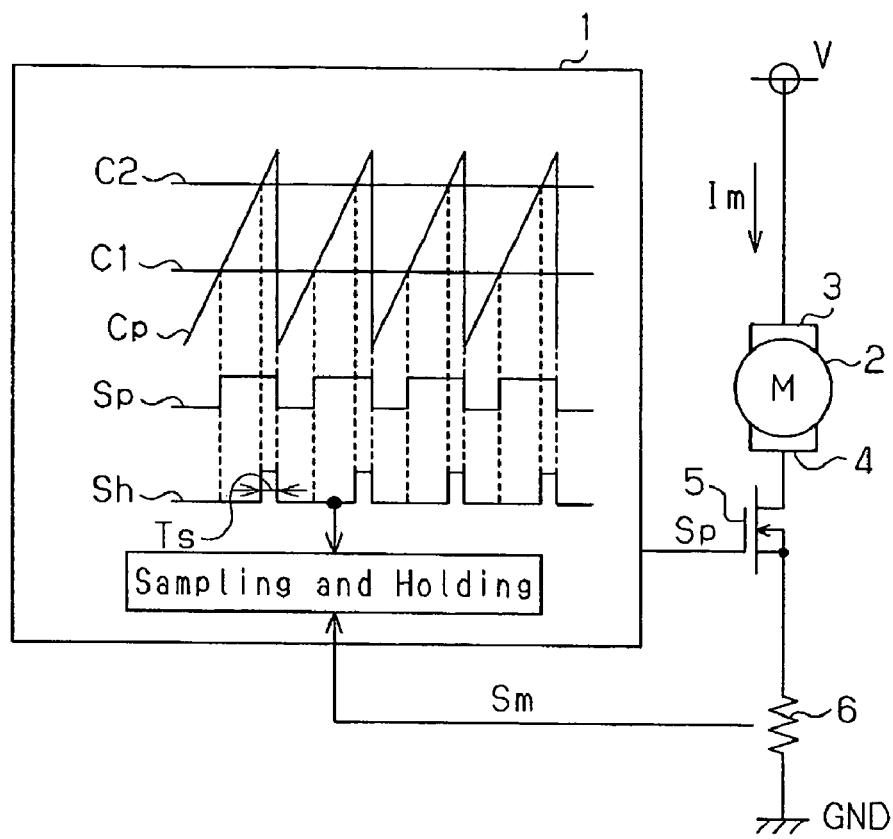
FIG. 1 is a schematic view showing the structure of a motor control device of a first embodiment according to the present invention.
Figure 2:
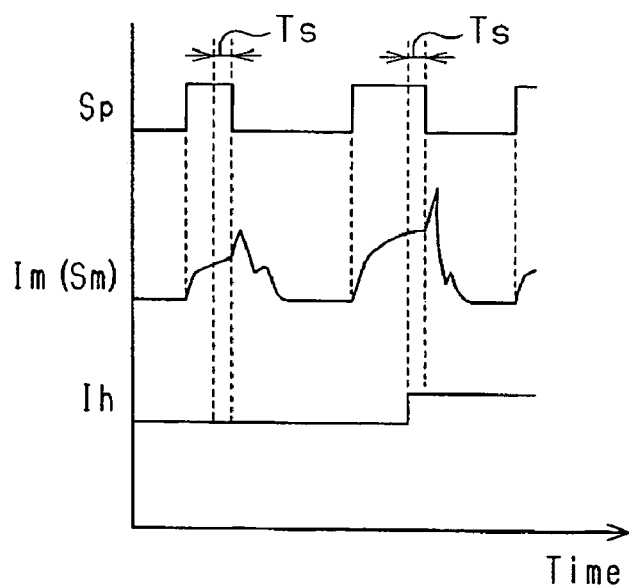
FIG. 2 is a graph indicating the waveforms of a PWM control signal, a motor current, and a sampling and holding value.

As illustrated in FIG. 1, a motor control device 1 according to the present invention controls the speed of an air blowing motor 2 for a vehicle air conditioner in accordance with pulse width modulation (PWM) controlling. The control device 1 also has an overcurrent protecting function for protecting the motor 2 from an overcurrent. The motor 2 includes a power terminal 3 connected to the plus side of a DC power supply V (a battery). An opposed power terminal 4 of the motor 2 is connected to the ground GND through a drive transistor 5, which serves as a switching element such as an FET, and a resistor 6. The control device 1 sends a PWM control signal Sp, or a control signal, to a control terminal (a gate terminal) of the drive transistor 5. The drive transistor 5 is turned on or off selectively in accordance with the PWM control signal Sp. The drive transistor 5 supplies a drive current Im from the DC power supply V to the motor 2. The drive current Im is varied in correspondence with the proportion of the time for which the drive transistor 5 is maintained in an activated state to the time for which the drive transistor 5 is maintained in a de-activated state. The speed of the motor 2 is changed in accordance with the drive current Im.

The PWM control signal Sp, which is sent from the control device 1 to the drive transistor 5, is varied in a pulse like manner switching between high level and low level, such that the drive transistor 5 is selectively turned on or off. The control device 1 adjusts the drive current Im for the motor 2 by changing the duty ratio of the PWM control signal Sp, or the time for which the drive transistor 5 is maintained as turned on (or the PWM control signal Sp is maintained at high level). The speed of the motor 2 is thus controlled.

The control device 1 generates the PWM control signal Sp using a PWM count value Cp and a first comparative value C1. The PWM count value Cp is a delta wave variation that varies digitally in a delta wave (saw tooth wave) manner. More specifically, the PWM count value Cp increases gradually to a maximum value. However, once reaching the maximum value, the PWM count value Cp quickly drops to a minimum value. When reaching the minimum value, the PWM count value Cp re-increases gradually to the maximum value. In this manner, the PWM control value Cp is varied in an alternating, gradually increasing and quickly dropping manner. The control device 1 compares the PWM count value Cp with the first comparative value C1. If the PWM count value Cp is larger than the first comparative value C1, the control device 1 sets the PWM control signal Sp at high level. In contrast, if the PWM count value Cp is smaller than the first comparative value C1, the control device 1 sets the PWM control signal Sp at low level. Further, if the pulse width corresponding to high level (the time for which high level is maintained) must be prolonged, the control device 1 decreases the first comparative value 1. In contrast, if the pulse width corresponding to high level must be shortened, the control device 1 increases the first comparative value 1. The duty ratio of the PWM control signal Sp is thus changed.

The control device 1 determines, as the sampling and holding time Ts, a time period between a first point in time when the PWM control signal Sp drops to low level and a second point in time that precedes the first point in time by a predetermined period. That is, the first point in time is a point in time at which sampling and holding is ended, and the second point in time is a point in time at which sampling and holding is started. In the sampling and holding time Ts, the control device 1 samples and holds a motor current Sm corresponding to the drive current Im supplied from the resistor 6 to the motor 2. The obtained value is defined as a motor current value Ih, or a sampling and holding value. More specifically, the control device 1 obtains the motor current Sm based on the potential difference between the opposing ends of the resistor 6. The control device 1 then samples and holds the obtained motor current Sm for determining the motor current value Ih. The control device 1 generates a sampling and holding signal Sh with reference to the PWM count value Cp and a second comparative value C2, which is a fixed value and larger than the first comparative value C1. That is, if the PWM count value Cp is larger than the second comparative value C2, the control device 1 sets the sampling and holding signal Sh at high level. In contrast, if the PWM count value Cp is smaller than the second comparative value C2, the control device 1 sets the sampling and holding signal Sh at low level. The sampling and holding signal Sh is maintained at high level only for a predetermined time period before the PWM control signal Sp drops to low level. In other words, the time period during which the sampling and holding signal Sh is maintained at high level corresponds to the sampling and holding time Ts. The control device 1 thus samples and holds the motor current Sm in accordance with the sampling and holding signal Sh at high level, obtaining the motor current value Ih. The sampling and holding time Ts is determined as a half of a minimum output time (a minimum activation time) of the PWM control signal Sp. The minimum output time indicates a predetermined minimum value of the time period during which the PWM control signal Sp is maintained at high level or low level for turning on the drive transistor 5. Thus, in the first embodiment, the minimum output time corresponds to a predetermined minimum value of the time period during which the PWM control signal Sp is maintained at high level.

Based on the motor current value Ih (see FIG. 2), the control device 1 determines whether or not the drive current Im supplied to the motor 2 is an overcurrent. If the judgment is positive, the control device 1 suspends the supply of the drive current Im to the motor 2, protecting the motor 2 from seizure, which is otherwise caused by the overcurrent. As described above, the sampling and holding time Ts, during which the motor current Sm is sampled and held, corresponds to the predetermined time period before the PWM control signal Sp drops to low level. Therefore, as shown in FIG. 2, the sampling and holding of the motor current Sm is performed when the motor current Sm is sufficiently large and is maintained in a stable state, or does not vary greatly. The obtained motor current value Ih thus becomes highly accurate, such that the overcurrent protecting function performs reliably.

The operational effects of the control device 1 of the first embodiment will now be explained.

(1) The control device 1 generates the PWM control signal Sp for selectively turning on or off the drive transistor 5. In this manner, the amount of the drive current Im supplied to the motor 2 is adjusted. Further, based on the motor current value Ih obtained by sampling and holding the motor current Sm for the sampling and holding time Ts, the control device 1 controls the motor 2, or protects the motor 2 from an overcurrent. The sampling and holding time Ts corresponds to a time period between a first point in time when the level of the PWM control signal Sp is switched for turning off the drive transistor 5 and a second point in time that precedes the first point in time by a predetermined period. That is, in the sampling and holding time Ts, the motor current Sm is sufficiently large and is maintained in a relatively stable state. As a result, the obtained motor current value Ih becomes highly accurate.

(2) The PWM control signal Sp is produced based on the comparison between the PWM count value Cp, which changes in a delta wave manner, or in an alternating, gradually increasing and quickly dropping manner, and the first comparative value C1. The sampling and holding signal Sh is generated based on the comparison between the PWM count value Cp and the second comparative value C2. The sampling and holding time Ts corresponds to the time period during which the sampling and holding signal Sh is maintained at high level. Therefore, using the PWM count value Cp for generating the PWM control signal Sp, the sampling and holding signal Sh, which is maintained at high level for a predetermined time period before the PWM control signal Sp is switched from high level to low level, is generated easily.

(3) The sampling and holding time Ts is set as a half of the minimum output time (the minimum activation time) of the PWM control signal Sp. This shortens the time for reliably detecting the motor current value Sm.

A second embodiment of the present invention will hereafter be described with reference to FIGS. 3 to 7.

Figure 3:
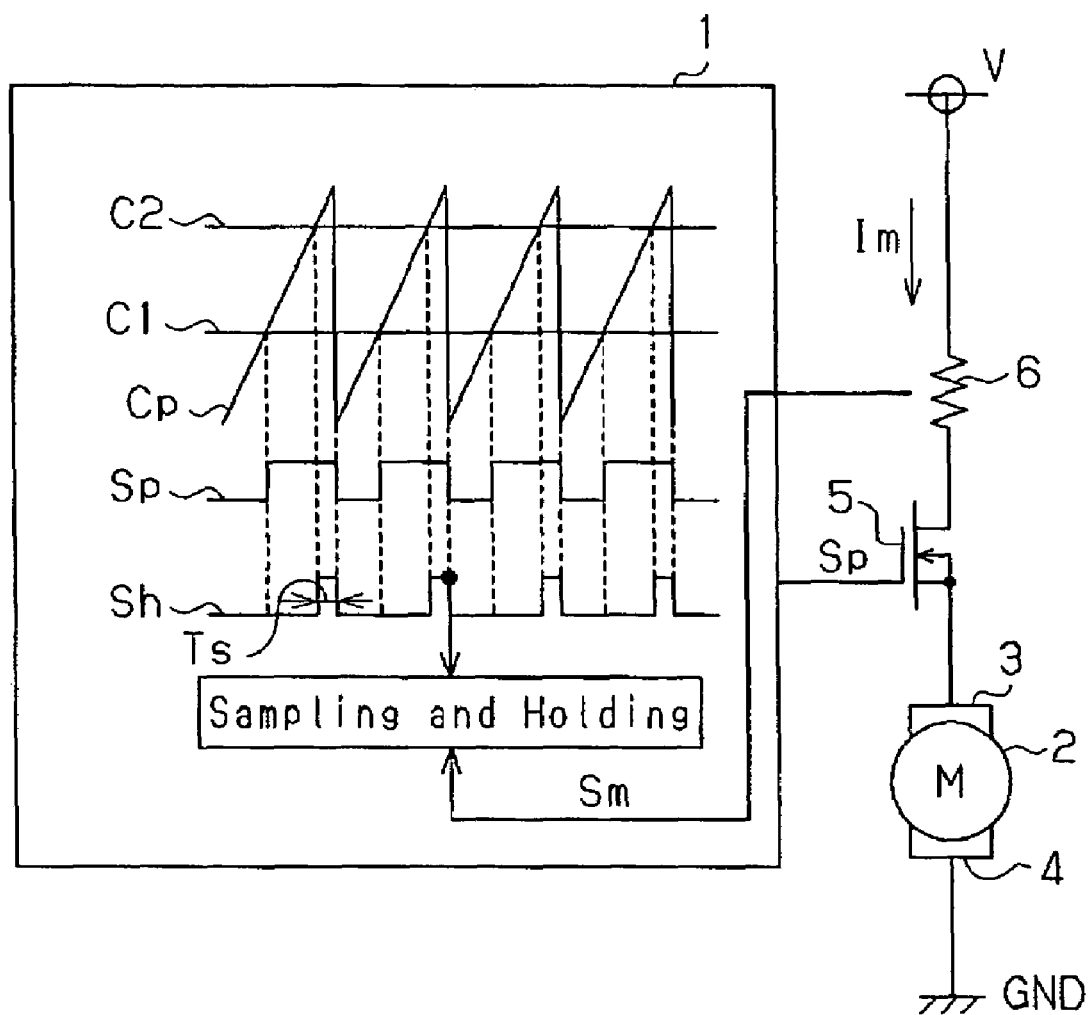
FIG. 3 is a schematic view showing the structure of a motor control device of a second embodiment according to the present invention.

As illustrated in FIG. 3, a motor control device 1 of the second embodiment controls, like the first embodiment, the speed of an air blowing motor 2 for a vehicle air conditioner, in accordance with pulse width modulation (PWM) controlling. The control device 1 also has an overcurrent protecting function for protecting the motor 2 from an overcurrent. The motor 2 includes a power terminal 3 connected to the plus side of a DC power supply V (a battery) through a drive transistor 5, which serves as a switching element such as an FET, and a resistor 6. An opposed power terminal 4 of the motor 2 is connected to the ground GND.

The control device 1 receives an instructing signal Sc and generates a control signal Sp having a duty ratio varied depending on the instructing signal Sc. The control signal Sp is then inputted to a control terminal (a gate terminal) of the drive transistor 5, which connects the motor 2 to the DC power supply V. In response to the control signal Sp, the drive transistor 5 is selectively turned on or off. The drive transistor 5 supplies the motor 2 with a drive current Im from the DC power supply V, which is varied in correspondence with the time period during which the transistor 5 is maintained in an actuated state. The speed of the motor 2 is changed in accordance with the drive current Im.

In the air blowing motor 2 for a vehicle air conditioner, a motor casing is often secured to the vehicle. The motor casing is formed of a conductive material, and the power terminal 4 is connected to the casing. Further, radio noise can be suppressed by connecting the motor casing to the ground. Therefore, the configuration of the second embodiment makes it possible to reliably actuate the motor 2 and protect the motor 2 from an overcurrent.

The structure of the control device 1 will be explained as follows.

Figure 4:
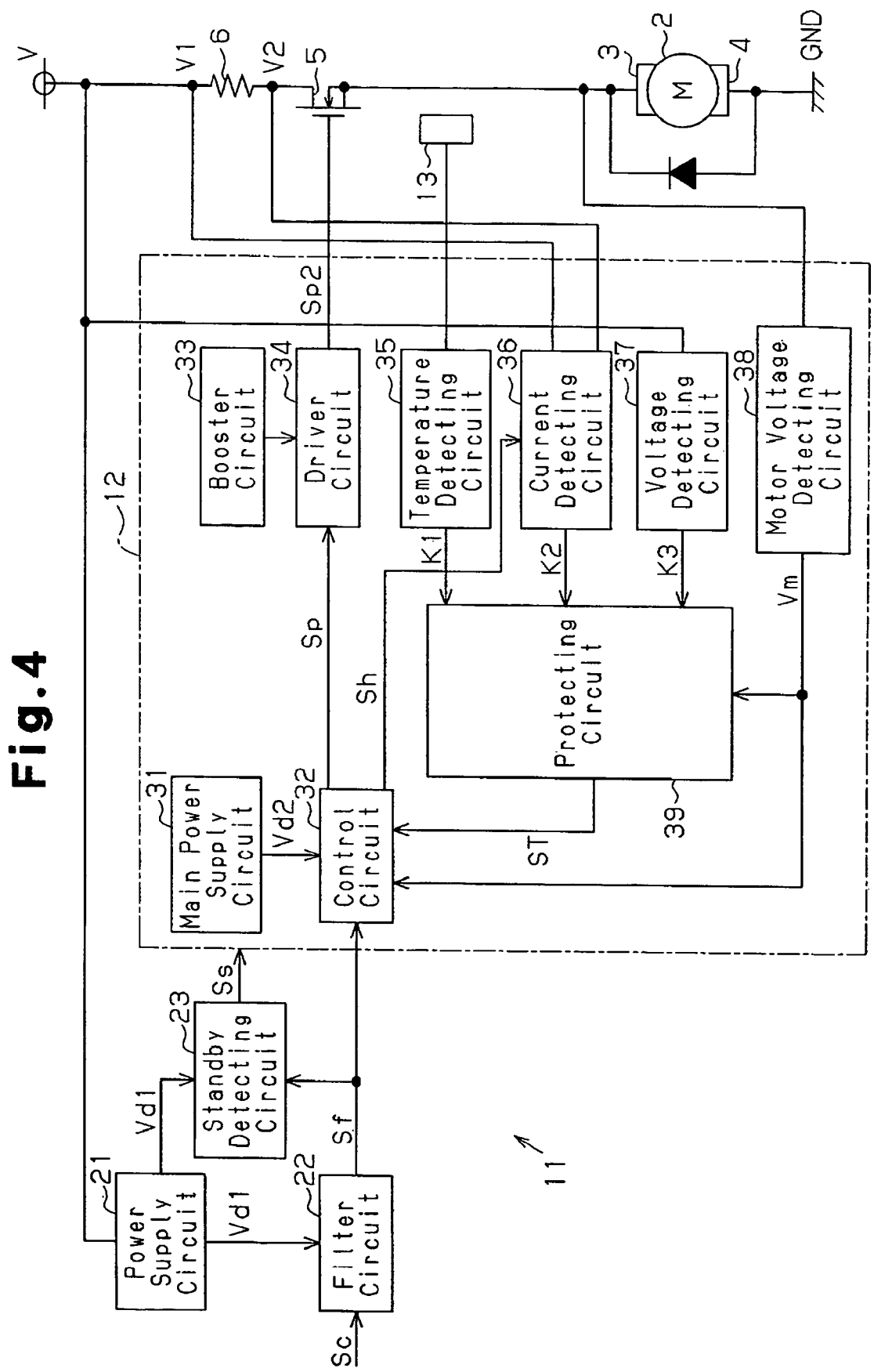
FIG. 4 is a block diagram showing the circuit of the motor control device of FIG. 3.

With reference to FIG. 4, the control device 1 includes an input portion 11 and a control portion 12.

The input portion 11 includes a power supply circuit 21, a filter circuit 22, and a standby detecting circuit 23.

The power supply circuit 21 provides an internal power supply Vd1 to the filter circuit 22 and the standby detecting circuit 23. The internal power supply Vd1 is obtained by converting the voltage of the DC power supply V, or the battery mounted in the vehicle, which is, for example, 12 volts, to a predetermined voltage (for example, five volts).

The filter circuit 22 receives an instructing signal Sc having a duty ratio varied in correspondence with the speed of the motor 2. The filter circuit 22 is formed by a voltage converting circuit including a smoothing circuit. The filter circuit 22 outputs a signal Sf having a voltage varied in correspondence with the duty ratio of the instructing signal Sc.

In accordance with the signal Sf, the standby detecting circuit 23 judges whether or not the instructing signal Sc is currently supplied to the control device 1. If the judgment is positive, the standby detecting circuit 23 sends a detecting signal Ss at a first level (for example, high level) to the control portion 12. In contrast, if the judgment is negative, the standby detecting circuit 23 sends the detecting signal Ss at a second level (for example, low level) to the control portion 12. When receiving the detecting signal Ss at the first level, all circuits of the control portion 12 are activated. However, when receiving the detecting signal Ss at the second level, all or part of the circuits of the control portion 12 are stopped or operated at a relatively low speed. That is, the power consumed by the control portion 12 is relatively small when the instructing signal Sc is not supplied to the control device 1, as compared to when the instructing signal Sc is supplied to the control device 1.

Further, the control portion 12 may be configured to be operated by the power supplied by the standby detecting circuit 23. In this case, the standby detecting circuit 23 provides the internal power supply Vd1 to the control portion 12, as long as the instructing signal Sc is supplied to the control device 1. If the instructing signal Sc is not supplied to the control device 1, the standby detecting circuit 23 stops the supply of the internal power supply Vd1, or lowers the voltage of the internal power supply Vd1, which is supplied to the control portion 12.

The control portion 12 includes a main power supply circuit 31, a control circuit 32, a booster circuit 33, a driver circuit 34, a temperature detecting circuit 35, a current detecting circuit 36, a voltage detecting circuit 37, a motor voltage detecting circuit 38, and a protecting circuit 39.

The main power supply circuit 31 provides a main power supply Vd2 to the control circuit 32. The main power supply Vd2 is obtained by converting the voltage of the DC power supply V, or the battery of the vehicle, which is, for example, 12 volts, to a predetermined voltage (for example, five volts). Although not illustrated, the main power supply circuit 31 provides the main power supply Vd2 to the remaining circuits 33 to 39 of the control portion 12. Further, in accordance with the detecting signal Ss, the main power supply circuit 31 controls the main power supply Vd2 such that power consumption is saved.

The control circuit 32 generates a control signal Sp and a sampling and holding signal Sh, in accordance with the signal Sf from the filter circuit 22. While the control signal Sp is sent to the driver circuit 34, the sample and holding signal Sh is sent to the current detecting circuit 36.

The booster circuit 33 boosts the main power supply Vd2 and provides the boosted power supply, or a drive power supply, to the driver circuit 34. When receiving the drive power supply, the driver circuit 34 sends a drive signal Sp2 to the drive transistor 5. The drive signal Sp2 is obtained by converting the level of the control signal Sp, which is sent from the control circuit 32. The control signal Sp has a voltage substantially equal to the voltage of the main power supply Vd2 but lower than the voltage of the DC power supply V. Thus, the voltage of the control signal Sp is not sufficient for turning on the drive transistor 5. However, the drive signal Sp2 is generated using the voltage of the drive power supply that is higher than that of the main power supply Vd2. The drive transistor 5 is thus turned on by the drive signal Sp2.

A thermistor 13 is disposed in the vicinity of the drive transistor 5 for sensing the heat generated by the drive transistor 5. The thermistor 13 outputs a signal reflecting the temperature of the drive transistor 5 to the temperature detecting circuit 35. In correspondence with this signal, the temperature detecting circuit 35 detects the temperature of the drive transistor 5. Further, the temperature detecting circuit 35 compares the temperature of the drive transistor 5 with a predetermined value. Based on the comparison, the temperature detecting circuit 35 outputs a temperature detecting signal K1 to the protecting circuit 39.

The current detecting circuit 36 is connected to the opposing ends of the resistor 6, such that voltages V1, V2 at the ends of the resistor 6 are inputted to the current detecting circuit 36. The current detecting circuit 36 determines a motor current Sm in accordance with the potential difference between the voltages V1, V2. The current detecting circuit 36 then samples and holds the motor current Sm in response to a sampling and holding signal Sh and thus obtains a motor current value Ih. Based on the motor current value Ih, the current detecting circuit 36 judges whether or not the drive current Im supplied to the motor 2 is an overcurrent. Based on the judgment, the current detecting circuit 36 outputs a current detecting signal K2 to the protecting circuit 39.

The voltage detecting circuit 37 detects the voltage of the power supplied to the control device 1 and generates a voltage detecting signal K3 corresponding to the detected voltage. More specifically, if the voltage is lower than a first value (for example, a half of the battery voltage), the control device 1 operates in an unstable manner. If the detected voltage is higher than a second value (for example, 80 volts), the control device 1 and the motor 2 are to be damaged. In order to prevent these problems, the voltage detecting circuit 37 compares the voltage of the power supply applied to the control device 1 with the first and second values and, based on the comparison, outputs the voltage detecting signal K3 to the protecting circuit 39.

The motor voltage detecting circuit 38 is connected to the power terminal 3 of the motor 2, which is closer to the DC power supply V, for detecting a motor voltage value Vm at the power terminal 3.

If a problem such as an overcurrent is detected in accordance with the outputs of the detecting circuits 35 to 38, the protecting circuit 39 outputs a suspending signal ST to the control circuit 32.

The control circuit 32 changes the duty ratio of the PWM control signal Sp in accordance with the motor voltage value Vm, which is detected by the motor voltage detecting circuit 38. The activation time of the drive transistor 5 (the time period during which the PWM control signal Sp is maintained at high level) is thus changed. This changes the amount of the drive current Im supplied to the motor 2 through the drive transistor 5, and the motor 2 operates at a corresponding speed.

Further, in response to the suspending signal ST from the protecting circuit 39, the control circuit 32 changes the PWM control signal Sp so as to turn off the drive transistor 5. In other words, a protecting function is provided such that the motor 2 is stopped when a problem such as an overcurrent is detected.

Figure 5:
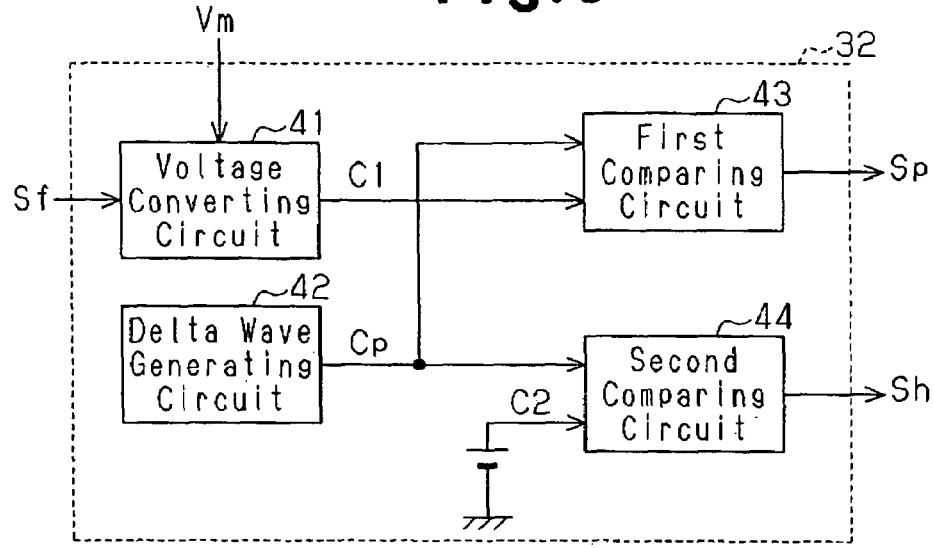
FIG. 5 is a block diagram showing a control circuit of the motor control device of FIG. 4.

Next, the configuration of the control circuit 32 will be explained. FIG. 5 is a block diagram showing the configuration of the control circuit 32.

The control circuit 32 includes a voltage converting circuit 41, a delta wave generating circuit 42, a first comparing circuit 43, and a second comparing circuit 44. The voltage converting circuit 41 receives the signal Sf from the filter circuit 22 and the motor voltage value Vm from the motor voltage detecting circuit 38. In accordance with the signal Sf and the motor voltage value Vm, the voltage converting circuit 41 outputs a first comparative value C1 to the first comparing circuit 43, such that the motor voltage value Vm is stabilized.

The delta wave generating circuit 42 generates a PWM count value Cp as a delta wave variation that is varied digitally in a delta wave (saw tooth wave) manner. The PWM count value Cp is inputted to the first and second comparing circuits 43, 44.

The first comparing circuit 43 compares the first comparative value C1 with the PWM count value Cp. If the PWM count value Cp is larger than the first comparative value C1, the first comparing circuit 43 sets the PWM control signal Sp at high level. If the PWM count value Cp is smaller than the first comparative value C1, the first comparing circuit 43 sets the PWM control signal Sp at low level.

The second comparing circuit 44 compares the second comparative value C2 with the PWM count value Cp. If the PWM count value Cp is larger than the second comparative value C2, the second comparing circuit 44 sets the sampling and holding signal Sh at high level. If the PWM count value Cp is smaller than the second comparative value C2, the second comparing circuit 44 sets the sampling and holding signal Sh at low level.

Figure 6:
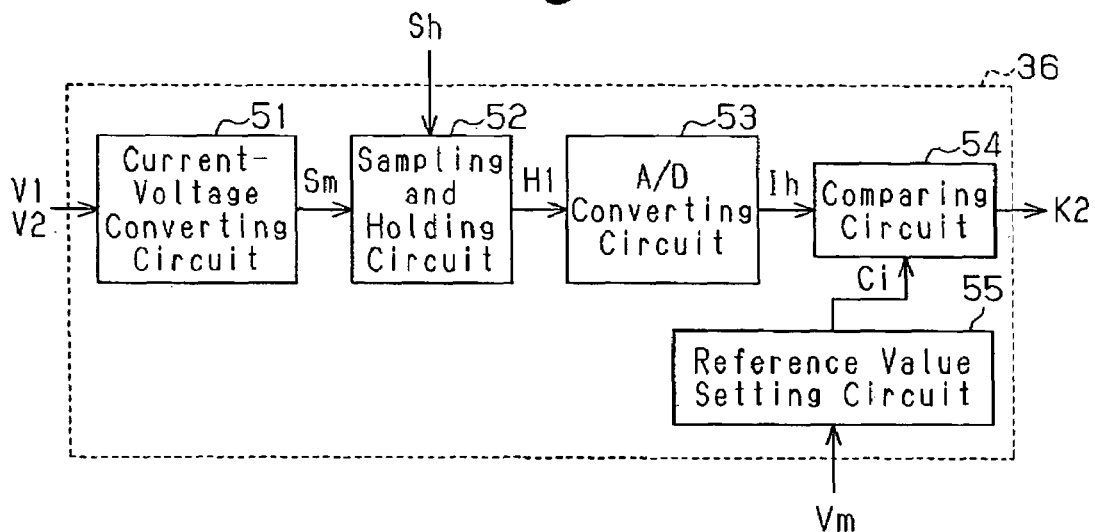
FIG. 6 is a block diagram showing a current detecting circuit of the motor control device of FIG. 4.

The configuration of the current detecting circuit 36 will be explained as follows. FIG. 6 is a block diagram showing the configuration of the current detecting circuit 36.

The current detecting circuit 36 includes a voltage-current converting circuit 51, a sampling and holding circuit 52, an analog-digital (A/D) converting circuit 53, a comparing circuit 54, and a reference value setting circuit 55.

The voltages V1, V2 at the opposing ends of the resistor 6 of FIG. 4 are inputted to the voltage-current converting circuit 51. The voltage-current converting circuit 51 then converts the potential difference between the voltages V1, V2 into the motor current Sm.

The sampling and holding circuit 52 samples and holds the motor current Sm in response to the sampling and holding signal Sh and outputs a signal H1 having the held potential to the A/D converting circuit 53.

The output of the sampling and holding circuit 52, the signal H1, is then analog-digital converted for obtaining the motor current value Ih. The A/D converting circuit 53 then outputs the motor current value Ih to the comparing circuit 54.

Figure 7:
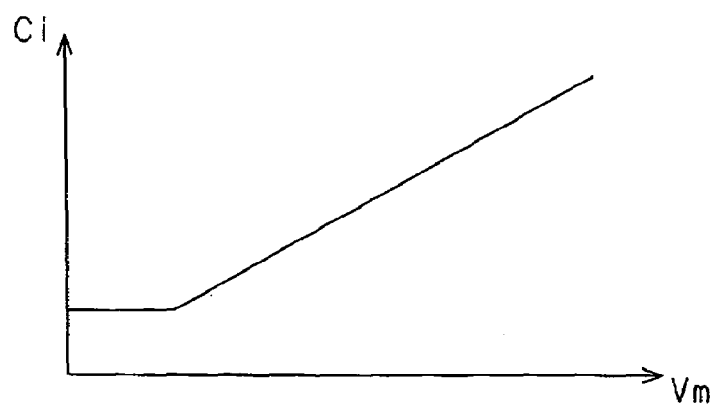
FIG. 7 is a graph indicating motor voltage value versus reference value.

Subsequently, the comparing circuit 54 compares the motor current value Ih with a reference value Ci, which is sent from the reference value setting circuit 55. Based on the comparison, the comparing circuit 54 outputs a current detecting signal K2. The reference value setting circuit 55 has a map representing the characteristics of the reference value Ci with respect to the motor voltage value Vm, as shown in FIG. 7. The reference value Ci is determined in correspondence with the motor voltage value Vm with reference to the map. The reference value Ci is used for judging whether or not the current flowing through the motor 2, as determined in correspondence with the motor voltage value Vm, is an overcurrent. Based on the comparison between the motor current value Ih and the reference value Ci, the comparing circuit 54 generates the current detecting signal K2.

As described above, the second embodiment also has the operational effects (1) to (3) of the first embodiment.

Further, since the motor 2 is connected to the ground GND in the second embodiment, the motor 2 is relatively easy to install. Also, external factors such as radio noise are suppressed by connecting the casing of the motor 2 to the ground GND, thus enabling the motor 2 to operate stably. In addition, the resistor 6 for detecting the motor current is deployed between the DC power supply V and the motor 2. This makes it possible to detect the motor current in a stable manner. The motor 2 is thus protected from an overcurrent reliably.

The illustrated embodiments may be modified as follows.

In each of the embodiments, the drive transistor 5 is actuated in response to the PWM control signal Sp at high level. However, the drive transistor 5 may be actuated when the PWM control signal Sp is at low level. Also, the drive transistor 5 does not necessarily have to be an FET. In addition, a plurality of drive transistors 5 may be provided.

In the illustrated embodiments, the motor 2 is controlled in accordance with PWM controlling. However, controlling of the motor 2 may be performed in accordance with a different controlling method such as pulse frequency modulation (PFM) controlling.

In the embodiments, the PWM count value Cp, which is digitally varied, is employed as the delta wave variation. However, the PWM count value Cp may be replaced by a different value that is varied in an analog manner. Further, a value varied in accordance with a different waveform other than the delta waveform may be employed.

Although the second comparative value C2 is a fixed value in the illustrated embodiments, the second comparative value C2 may be varied.

In the illustrated embodiments, the sampling and holding time Ts is set as a half of the minimum output time (the minimum activation time) of the PWM control signal Sp. However, the present invention it not restricted to the embodiments. The sampling and holding time Ts may be modified as needed, as long as the sampling and holding time Ts remains shorter than the minimum output time of the PWM control signal Sp.

In each of the illustrated embodiments, the present invention is embodied as the control device 1 for controlling the air blowing motor 2 of the vehicle air conditioner. However, the present invention may be embodied as a control device for a motor used in different equipment.

The present examples and embodiments are to be considered as illustrative and not restrictive and the invention is not to be limited to the details given herein, but may be modified within the scope and equivalence of the appended claims.

The invention claimed is:

1. A device for controlling a motor by means of a switching element, wherein:
   the device outputs a pulse-like control signal to the switching element, the control signal being switched between high level and low level for selectively turning on or off the switching element such that the motor is supplied with a current in correspondence with a turned on state of the switching element;
   the device samples and holds the current supplied to the motor for a predetermined sampling and holding time for obtaining a value of the motor current, the device controlling the motor in accordance with the obtained value;
   the device determines, as the sampling and holding time, a time period between a first point in time when the level of the control signal is switched for turning off the switching element and a second point in time that precedes the first point in time by a predetermined period;
   the device generates the control signal by comparing a delta wave variation with a predetermined first comparative value, the delta wave variation being varied in a delta wave manner or in an alternating, gradually increasing and quickly dropping manner; and
   the device generates a pulse-like sampling and holding signal by comparing the delta wave variation with a predetermined second comparative value, the sampling and holding signal being switched between high level and low level, the device determining, as the sampling and holding time, the time period during which the sampling and holding signal is maintained at high level or low level.

2. The device according to claim 1, wherein:
   the device sets the control signal at one of high level and low level if the delta wave variation is larger than the first comparative value and at the other level if the delta wave variation is smaller than the first comparative value; and
   the device sets the sampling and holding signal at one of high level and low level if the delta wave variation is larger than the second comparative value and at the other level if the delta wave variation is smaller than the second comparative value.

3. The device according to claim 1, wherein the first comparative value is variable.

4. The device according to claim 1, wherein the second comparative value is fixed.

5. The device according to claim 1, wherein the control signal is a PWM control signal for controlling the motor in accordance with PWM controlling.

6. The device according to claim 1, wherein the motor is an air blowing motor for a vehicle air conditioner.

7. A device for controlling a motor by means of a switching element, wherein:
   the device outputs a pulse-like control signal to the switching element, the control signal being switched between high level and low level for selectively turning on or off the switching element such that the motor is supplied with a current in correspondence with a turned on state of the switching element;
   the device samples and holds the current supplied to the motor for a predetermined sampling and holding time for obtaining a value of the motor current, the device controlling the motor in accordance with the obtained value;
   the device determines, as the sampling and holding time, a time period between a first point in time when the level of the control signal is switched for turning off the switching element and a second point in time that precedes the first point in time by a predetermined period, wherein the sampling and holding time is determined as a half of a predetermined minimum value of the time period during which the control signal is maintained at high level or low level for turning on the switching element.

8. A method for controlling a motor by means of a switching element, comprising:
   generating a delta wave variation varied in a delta wave manner or in an alternating, gradually increasing and quickly dropping manner;
   generating a pulse-like control signal, which is switched between high level and low level, by comparing the delta wave variation with a predetermined first comparative value;
   outputting the control signal to the switching element for selectively turning on or off the switching element such that the motor is supplied with a current in correspondence with a turned on state of the switching element;

sampling and holding the current supplied to the motor for a predetermined sampling and holding time for obtaining a value of the motor current;

controlling the motor in accordance with the obtained value;

determining, as the sampling and holding time, a time period between a first point in time when the level of the control signal is switched for turning off the switching element and a second point in time that precedes the first point in time by a predetermined period; and generating a pulse-like sampling and holding a signal by comparing the delta wave variation with a predetermined second comparative value, the sampling and holding signal being switched between high level and low level, wherein the time period during which the sampling and holding signal is maintained at high level or low level is determined as the sampling and holding time.

9. The method according to claim 8, wherein the sampling and holding time is determined as a half of a predetermined minimum value of the time period during which the control signal is maintained at high level or low level for turning on the switching element.

* * * * *